US012687895B2

(12) United States Patent
Lau et al.

(10) Patent No.: US 12,687,895 B2
(45) Date of Patent: Jul. 21, 2026

(54) SUPPORT STRUCTURE FOR DISPLAY

(71) Applicant: Colebrook Bosson & Saunders (Products) Limited, London (GB)

(72) Inventors: Alex Lau, London (GB); Barend Jacobse, London (GB); Kruno Knezic, London (GB); Alex Ambridge, Norfolk (GB); Alex Corrie, London (GB); Jack Tolliday, London (GB)

(73) Assignee: Colebrook Bosson & Saunders (Products) Limited, London (GB)

( * ) Notice: Subject to any disclaimer, the term of this patent is extended or adjusted under 35 U.S.C. 154(b) by 174 days.

(21) Appl. No.: 18/499,030

(22) Filed: Oct. 31, 2023

(65) Prior Publication Data

US 2024/0143023 A1 May 2, 2024

Related U.S. Application Data

(60) Provisional application No. 63/420,806, filed on Oct. 31, 2022.

(51) Int. Cl.
*G06F 1/16* (2006.01)
*F16M 11/20* (2006.01)

(52) U.S. Cl.
CPC .......... *G06F 1/166* (2013.01); *F16M 11/2035* (2013.01); *F16M 11/2057* (2013.01);
(Continued)

(58) Field of Classification Search
CPC .. G06F 1/166; Y10S 248/917; Y10S 248/918; Y10S 248/919; Y10S 248/924;
(Continued)

(56) References Cited

U.S. PATENT DOCUMENTS

| | | | |
|---|---|---|---|
| 2,022,366 A | 11/1935 | Boecking | |
| 3,559,976 A | 2/1971 | Jerz, Jr. | |

(Continued)

FOREIGN PATENT DOCUMENTS

| | | |
|---|---|---|
| CN | 103697428 A | 4/2014 |
| CN | 109202956 B | 7/2021 |

(Continued)

OTHER PUBLICATIONS

Siig, "Aluminum Mechanical Spring Slim Monitor Arm—Single," <https://www.siig.com/aluminum-mechanical-spring-slim-monitor-arm-single.html> web page visited Oct. 10, 2022 (4 pages).

(Continued)

*Primary Examiner* — Nidhi Thaker

(74) *Attorney, Agent, or Firm* — Michael Best & Friedrich LLP

(57) ABSTRACT

A support structure for supporting a display comprising a base element, an arm coupled to the base element, the arm extending along a longitudinal axis between a first end and a second end, a head for movably supporting the display on the arm, and a linkage assembly movable along the longitudinal axis. The linkage assembly includes a spring having a plurality of spring constants configured to generate a force that counteracts a weight of the display to maintain the display in a plurality of positions relative to a surface.

29 Claims, 17 Drawing Sheets

(52) U.S. Cl.
CPC ...... *F16M 11/2064* (2013.01); *F16M 11/2071* (2013.01); *Y10S 248/917* (2013.01); *Y10S 248/918* (2013.01); *Y10S 248/919* (2013.01); *Y10S 248/924* (2013.01)

(58) Field of Classification Search
CPC ........... F16M 11/2035; F16M 11/2057; F16M 11/2064; F16M 11/2071
See application file for complete search history.

(56) References Cited

U.S. PATENT DOCUMENTS

| | | | |
|---|---|---|---|
| 3,916,967 | A | 11/1975 | Carlisle et al. |
| 4,266,747 | A | 5/1981 | Souder, Jr. et al. |
| 4,447,031 | A | 5/1984 | Souder et al. |
| 4,669,694 | A | 6/1987 | Malick |
| 5,139,223 | A | 8/1992 | Sedighzadeh |
| 5,348,260 | A | 9/1994 | Acevedo |
| 6,070,839 | A | 6/2000 | Brenner et al. |
| 6,510,049 | B2 | 1/2003 | Rosen |
| 6,819,550 | B2 | 11/2004 | Jobs et al. |
| 6,964,399 | B1 | 11/2005 | O'Neill |
| 7,114,688 | B2* | 10/2006 | Rudolf ................ F16C 11/0619 248/278.1 |
| 7,152,836 | B2 | 12/2006 | Pfister et al. |
| 7,261,286 | B2 | 8/2007 | McConnell et al. |
| 7,380,760 | B2 | 6/2008 | Dittmer |
| 7,395,995 | B2 | 7/2008 | Chen |
| 7,434,769 | B1 | 10/2008 | May |
| 7,478,786 | B2 | 1/2009 | Copeland |
| 7,494,104 | B2* | 2/2009 | Baek ...................... F16M 11/10 248/917 |
| 7,510,155 | B2* | 3/2009 | Huang .............. F16M 11/2014 248/278.1 |
| 7,562,851 | B2 | 7/2009 | Hein et al. |
| 7,614,594 | B2* | 11/2009 | Baek .................. F16M 11/2021 16/302 |
| 7,637,463 | B2 | 12/2009 | Yen et al. |
| 7,690,611 | B2 | 4/2010 | Asamarai et al. |
| 7,726,616 | B2* | 6/2010 | Zhang ............... F16M 11/2021 248/920 |
| 7,866,618 | B2 | 1/2011 | Grabania et al. |
| 7,954,780 | B2 | 6/2011 | Dittmer |
| D645,868 | S | 9/2011 | Lau et al. |
| 8,066,232 | B2 | 11/2011 | Wills et al. |
| 8,072,739 | B2 | 12/2011 | Dittmer |
| 8,142,064 | B2 | 3/2012 | Baek et al. |
| 8,181,927 | B2 | 5/2012 | Farrow |
| 8,199,472 | B2 | 6/2012 | Shen et al. |
| 8,201,791 | B2 | 6/2012 | Zhang et al. |
| 8,251,325 | B2 | 8/2012 | Molter |
| 8,328,151 | B2* | 12/2012 | Gwag .................... F16M 11/10 248/922 |
| 8,469,323 | B1* | 6/2013 | Deros .................. F16M 11/105 248/124.2 |
| D688,674 | S | 8/2013 | Lau et al. |
| 8,585,001 | B2 | 11/2013 | Huang |
| 8,746,635 | B2 | 6/2014 | Kim et al. |
| 8,777,172 | B2 | 7/2014 | Sapper et al. |
| 8,876,074 | B2 | 11/2014 | Chen |
| 8,931,748 | B2 | 1/2015 | Bowman et al. |
| 8,960,632 | B2* | 2/2015 | Fallows ............. F16M 11/2092 248/575 |
| 9,004,431 | B2* | 4/2015 | Huang ................... F16M 11/24 248/282.1 |
| 9,074,721 | B2 | 7/2015 | Lau et al. |
| D740,830 | S | 10/2015 | Chu |
| 9,279,536 | B2 | 3/2016 | Dittmer et al. |
| 9,572,269 | B2* | 2/2017 | Lau ...................... F16M 13/022 |
| 9,936,593 | B2 | 4/2018 | Deily et al. |
| 9,993,071 | B2 | 6/2018 | Hung |
| D834,030 | S | 11/2018 | Lindo et al. |
| 10,159,158 | B2 | 12/2018 | Park et al. |
| 10,172,248 | B1 | 1/2019 | Park et al. |
| 10,274,131 | B2 | 4/2019 | Petts et al. |
| D847,823 | S | 5/2019 | Monsalve et al. |
| D848,444 | S | 5/2019 | Jung et al. |
| 10,309,578 | B2 | 6/2019 | Yen et al. |
| 10,317,058 | B2 | 6/2019 | Hung et al. |
| 10,344,911 | B2 | 7/2019 | Mills |
| 10,345,851 | B2 | 7/2019 | Park et al. |
| 10,487,974 | B2 | 11/2019 | Sherman |
| 10,801,660 | B1* | 10/2020 | Liu ........................ F16M 11/08 |
| 10,845,000 | B2 | 11/2020 | Lau |
| 10,851,938 | B2 | 12/2020 | Glickstein et al. |
| D910,028 | S | 2/2021 | Pelly et al. |
| 11,828,406 | B2* | 11/2023 | Lau .................... F16M 11/2014 |
| D1,011,354 | S | 1/2024 | You et al. |
| D1,055,076 | S | 12/2024 | Monsalve et al. |
| D1,060,370 | S | 2/2025 | Chang |
| 2005/0284997 | A1* | 12/2005 | Tisbo .................. F16M 13/022 248/276.1 |
| 2006/0060735 | A1* | 3/2006 | Oddsen ............. F16M 11/2064 248/278.1 |
| 2006/0157627 | A1 | 7/2006 | Hung |
| 2007/0001076 | A1 | 1/2007 | Asamarai et al. |
| 2007/0064379 | A1* | 3/2007 | Shin ................... F16M 11/2064 361/679.06 |
| 2007/0153459 | A1 | 7/2007 | Wohlford et al. |
| 2008/0029661 | A1* | 2/2008 | Chen .................. F16M 11/2064 248/176.1 |
| 2008/0054133 | A1* | 3/2008 | Huang .............. F16M 11/2064 248/178.1 |
| 2008/0164395 | A1* | 7/2008 | Chang .............. F16M 11/2035 248/276.1 |
| 2008/0191109 | A1 | 8/2008 | Liang |
| 2009/0166501 | A1* | 7/2009 | Wang ..................... F16M 11/10 248/419 |
| 2009/0304377 | A1 | 12/2009 | Chang et al. |
| 2010/0319164 | A1 | 12/2010 | Bax et al. |
| 2011/0108698 | A1* | 5/2011 | Chen .................. F16M 11/2014 248/220.22 |
| 2011/0260017 | A1 | 10/2011 | Monsalve et al. |
| 2011/0303805 | A1 | 12/2011 | Lau et al. |
| 2012/0090212 | A1* | 4/2012 | Chen ...................... F16M 11/10 40/745 |
| 2012/0138754 | A1 | 6/2012 | Lim |
| 2013/0161466 | A1 | 6/2013 | Lau et al. |
| 2013/0314890 | A1 | 11/2013 | Smith |
| 2014/0197289 | A1* | 7/2014 | Chen .................... F16M 13/022 248/231.71 |
| 2015/0053829 | A1* | 2/2015 | Lu .......................... F16M 11/12 248/123.11 |
| 2016/0305600 | A1* | 10/2016 | Bowman ............. F16M 11/041 |
| 2017/0048439 | A1 | 2/2017 | Von Borcke-morawitz et al. |
| 2018/0080596 | A1 | 3/2018 | Mills et al. |
| 2019/0301670 | A1 | 10/2019 | Glickstein et al. |
| 2020/0116301 | A1 | 4/2020 | Luo |
| 2020/0326031 | A1 | 10/2020 | Liu |
| 2021/0293375 | A1* | 9/2021 | Ambridge .......... F16M 11/2014 |
| 2022/0364675 | A1 | 11/2022 | Lau et al. |
| 2023/0122578 | A1* | 4/2023 | Kim .................. F16M 11/2064 |
| 2024/0143023 | A1 | 5/2024 | Lau et al. |

FOREIGN PATENT DOCUMENTS

| | | | | |
|---|---|---|---|---|
| EP | 1541391 | B1 | 3/2010 | |
| GB | 6445977 | | 5/2025 | |
| GB | 6445978 | | 5/2025 | |
| GB | 6445979 | | 5/2025 | |
| WO | 2007137905 | A1 | 12/2007 | |
| WO | 2008035602 | A1 | 3/2008 | |
| WO | WO-2011154703 | A2* | 12/2011 | ............ F16M 13/02 |
| WO | 2012075190 | A2 | 6/2012 | |
| WO | 2013171502 | A1 | 11/2013 | |
| WO | WO-2016028848 | A1* | 2/2016 | ............... F16F 3/04 |
| WO | 2016128765 | A1 | 8/2016 | |

(56) References Cited

FOREIGN PATENT DOCUMENTS

| | | | |
|---|---|---|---|
| WO | 2018141000 | A1 | 8/2018 |
| WO | 2020144660 | A1 | 7/2020 |

OTHER PUBLICATIONS

International Search Report and Written Opinion for Application No. PCT/IB2023/000663 dated Feb. 8, 2024 (13 pages).
Proaim. Link: https://www.proaim.com/products/proaim-360-rotation-vesa-75mm-100mm-tilting-monitor-mount-with-5-8-baby-pin-receiver. Visited Jan. 22, 2026. Proaim 360° Rotation VESA 75mm/100mm Tilting Monitor Mount with 5/8" Baby Pin Receiver (Year: 2026).
United States Patent Office Requirement for Restriction/Election for U.S. Appl. No. 30/007,272 dated Jan. 30, 2026 (10 pages).
Amazon. Link: https://www.amazon.com/Herman-Miller-Flo-Single-Monitor/dp/B006J1174U/. Jan. 13, 2012. Herman Miller Flo Single Monitor Arm (Year: 2012).

* cited by examiner

SUPPORT STRUCTURE FOR DISPLAY

CROSS-REFERENCE TO RELATED APPLICATIONS

This application claims priority to U.S. Provisional Patent Application No. 63/420,806, filed on Oct. 31, 2022, the entire contents of which are incorporated by reference herein.

BACKGROUND

The present invention relates to a support structure, and more particularly, to a support structure for a monitor or display.

Displays such as computer monitors, TVs, liquid crystal displays (LCD), etc., can be mounted on elevated support devices such as a support arm which can then be secured to a surface such that the display is held above or in front of the surface. It is often desired by users to adjust the height or location of the display relative to the surface to gain a better view of the display. However, many support structures for displays are difficult to adjust and require greater effort by the user to adjust the height or location of the display. Further, many support structures are complicated and expensive to build.

SUMMARY

The present application provides, in one aspect, a support structure for supporting a display comprising a base element, an arm coupled to the base element, the arm extending along a longitudinal axis between a first end and a second end, a head for movably supporting the display on the arm, and a linkage assembly movable along the longitudinal axis. The linkage assembly includes a spring having a plurality of spring constants configured to generate a force that counteracts a weight of the display to maintain the display in a plurality of positions relative to a surface.

The present application provides, in another aspect, a support structure for supporting a display comprising a base element, an arm coupled to the base element, the arm extending along a longitudinal axis between a first end and a second end, a head for movably supporting the display on the arm, and a linkage assembly. The linkage assembly includes a slider movable along the longitudinal axis, a first link pivotally connected to the base element and the slider, a second link pivotally connected to the slider and the head, and a spring positioned in the slider.

The present application provides, in another aspect, a support structure for supporting a display, the support structure including an arm extending along a longitudinal axis between a first end and a second end, and a tilt head rotatably coupled to a first end of the arm. The tilt head includes a joint body movably connected to the support structure, a pan head received in the joint body and movable relative to the joint body, and a ring received in the pan head. The ring is movable relative to the pan head to adjust the display to a plurality of different tilt angles. The ring rotatable relative to the pan head to adjust the display to a plurality of different rotational angles relative to a surface. A linkage assembly positioned in the arm and coupled to the tilt head. The linkage assembly is configured to rotate the tilt head when the arm rotates to counteract the rotation of the arm and maintain a consistent orientation of the tilt head.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology and terminology used herein is for the purpose of description and should not be regarded as limiting.

Figure 1:
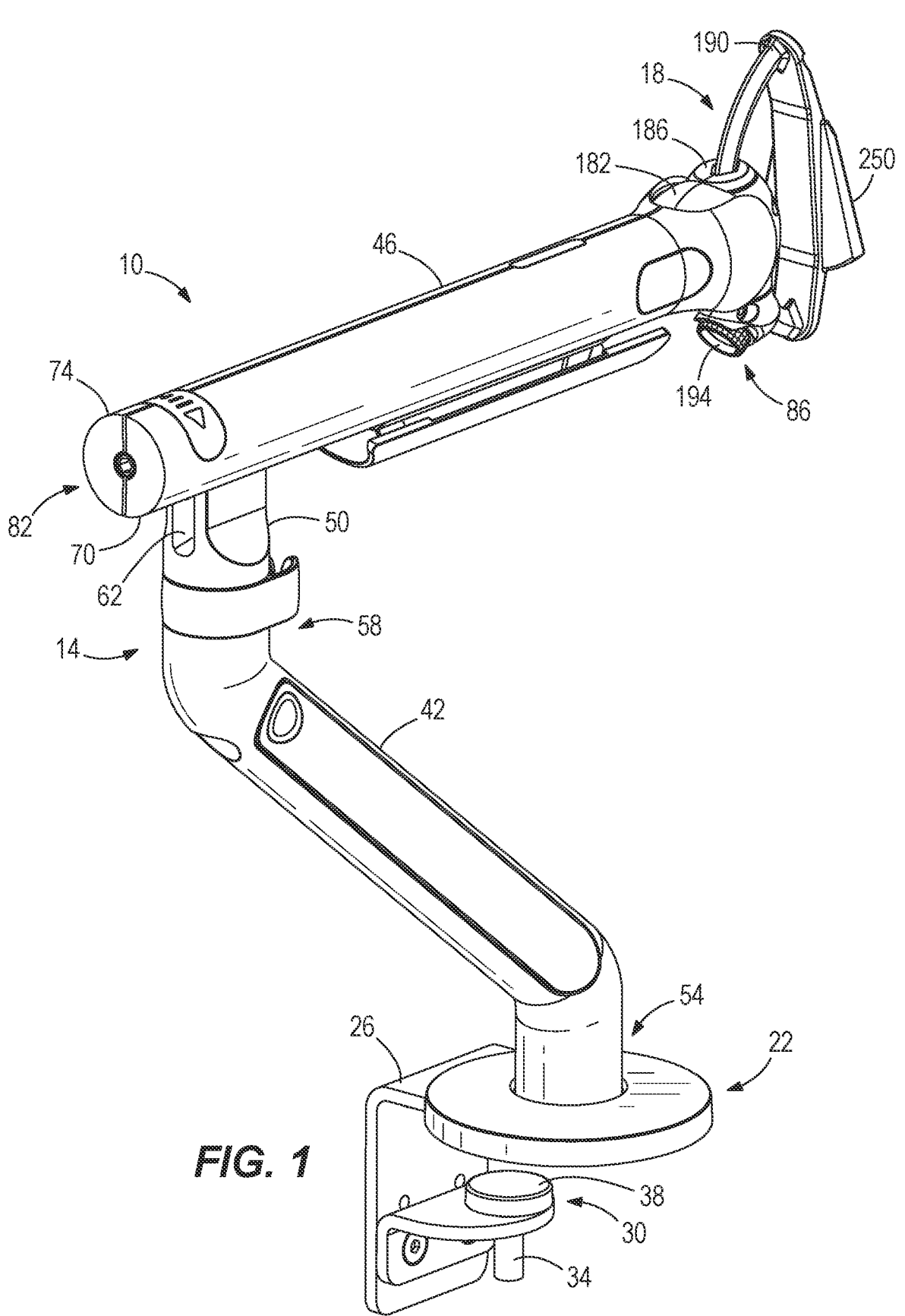
FIG. 1 is a perspective view of a support structure.

FIG. 1 illustrates a support structure 10 configured to support a display. In some embodiments, the display may be a computer monitor, screen, TV, or other display. The support structure 10 may be coupled to a base. In some embodiments, the base may include a horizontal base such as desktops, or tabletops. In other embodiments, the base may include a vertical base such as a wall or post. The support structure 10 is movable in a number of positions such that a display may be positioned in a preferred way by a user. As such, the support structure 10 is movable into a variety of positions to provide a better view of a display.

With reference to FIG. 1, the support structure 10 includes an arm assembly 14, and a head 18 for movably supporting a display on the arm assembly 14. The arm assembly 14 may optionally include a clamp 22 that may be secured to an edge of a base (e.g., table or desk). The clamp 22 may include a c-shaped bracket 26 that defines a channel 30 for receiving a table or desk. The c-shaped bracket 26 may be formed monolithically as a single structure. In other embodiments, the c-shaped bracket 26 may be formed as two or more separate structures. The clamp 22 further includes a fastener 34 extending into the channel 30 that secures the support structure 10 to the base. The fastener 34 includes a flange 38 having a flat surface that engages the base. The clamp 22 may optionally include a knob connected to the fastener 34 that allows a user to tighten or loosen the clamp 22 (not shown). In other embodiments, the knob may be a screw head capable of receiving a tool for tightening or loosening the clamp 22 (not shown).

When the support structure 10 is positioned for use, a user may tighten the clamp 22 and secure the support structure 10 to the base. In other embodiments, the clamp 22 may include a L-shaped bracket formed monolithically as a single structure, or a L-shaped bracket formed as two or more separate structures. Still, in other embodiments, the support structure 10 may include other means of coupling to the base.

Figure 2:
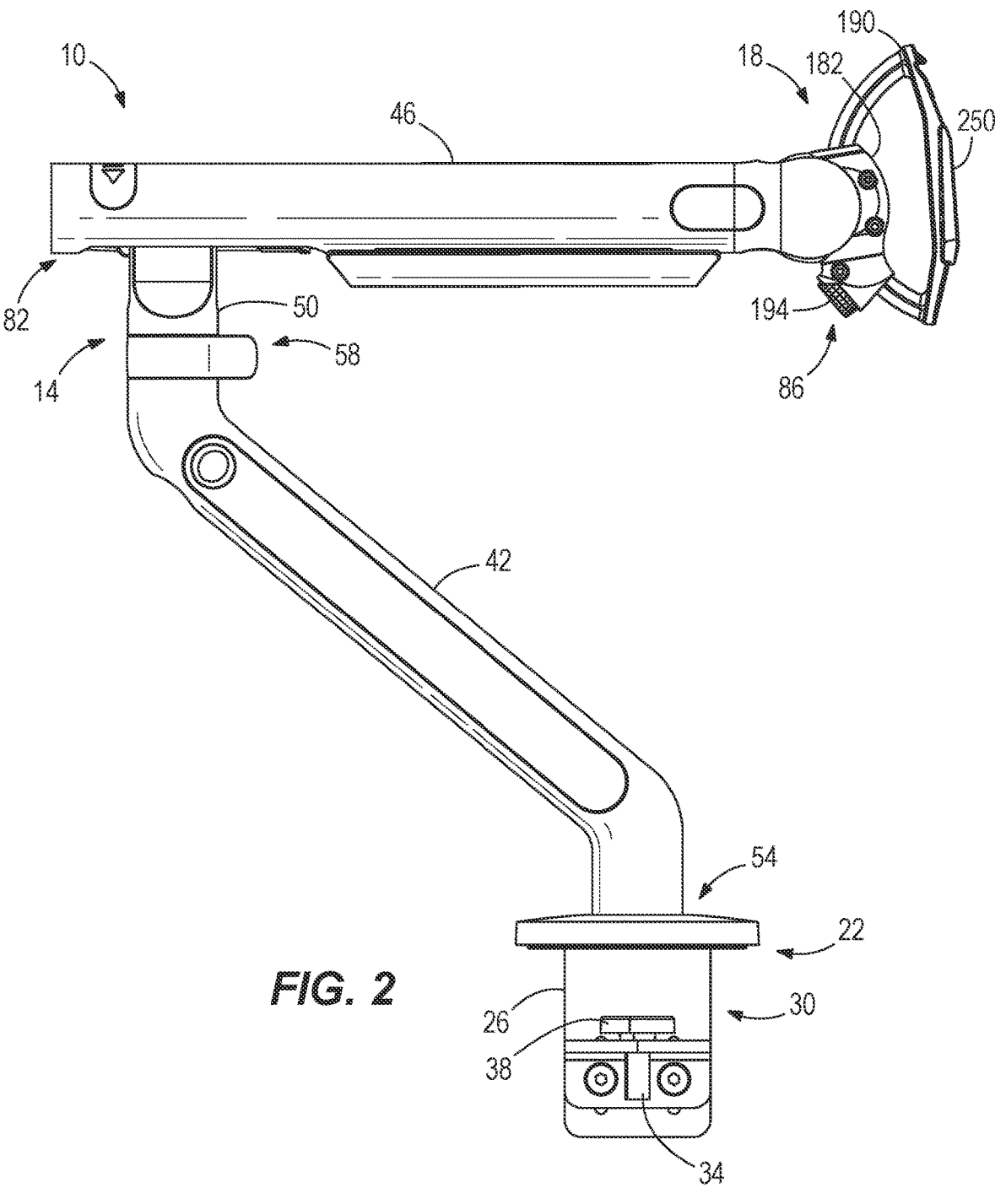
FIG. 2 is a side view of the support structure of FIG. 1.
Figure 4:
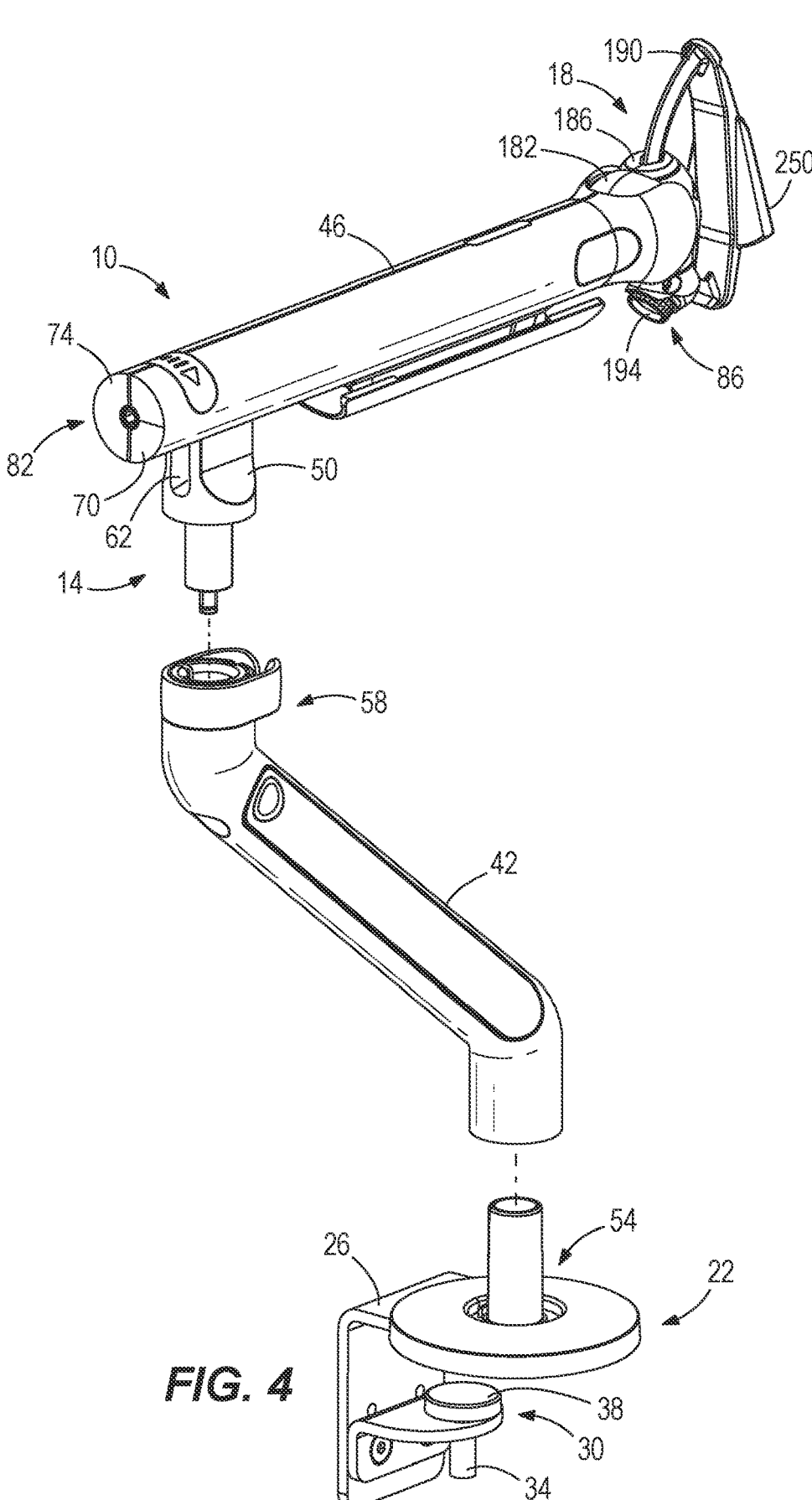
FIG. 4 is a partially exploded view of the support structure of FIG. 1.

FIGS. 2 and 4 illustrate the arm assembly 14 according to an exemplary embodiment. The following description is exemplary, and certain aspects and features of the arm assembly 14 may differ in other embodiments. For example, the size, shape, number of arms, and coupling mechanisms of the arm assembly 14 may differ in other embodiments. In the illustrated embodiment, the arm assembly 14 includes a first arm 42, a second arm 46, and a joint 50 for movably connecting the second arm 46 to the first arm 42. The clamp 22 is coupled to the first arm 42 to secure the arm assembly 14 to the base. The head 18 is coupled to the second arm 46 to connect a display to the arm assembly 14. The first arm 42 and the second arm 46 may also have a variety of different shapes in other embodiments.

With reference to FIGS. 1 and 2, the first arm 42 includes a first end 54 and a second end 58 opposite the first end 54. In some embodiments, the first arm 42 may be an elongated S-shaped arm. The first end 54 of the first arm 42 is connected to the clamp 22. In some embodiments, the first arm 42 may be formed monolithically as single structure. In other embodiments, the first arm 42 may be formed as two or more separate structures.

FIGS. 2 and 4 illustrate the joint 50 arranged between the first arm 42 and the second arm 46. The joint 50 may also be referred to as a base element. The joint 50 defines a joint slot 62 for receiving a portion of a linkage assembly 66 described in more detail below. The joint 50 is coupled to the second end 58 of the first arm 42. In the illustrated embodiment, the joint 50 may be formed monolithically as single structure. In other embodiments, the joint 50 may be formed as two or more separate structures.

Figure 3:
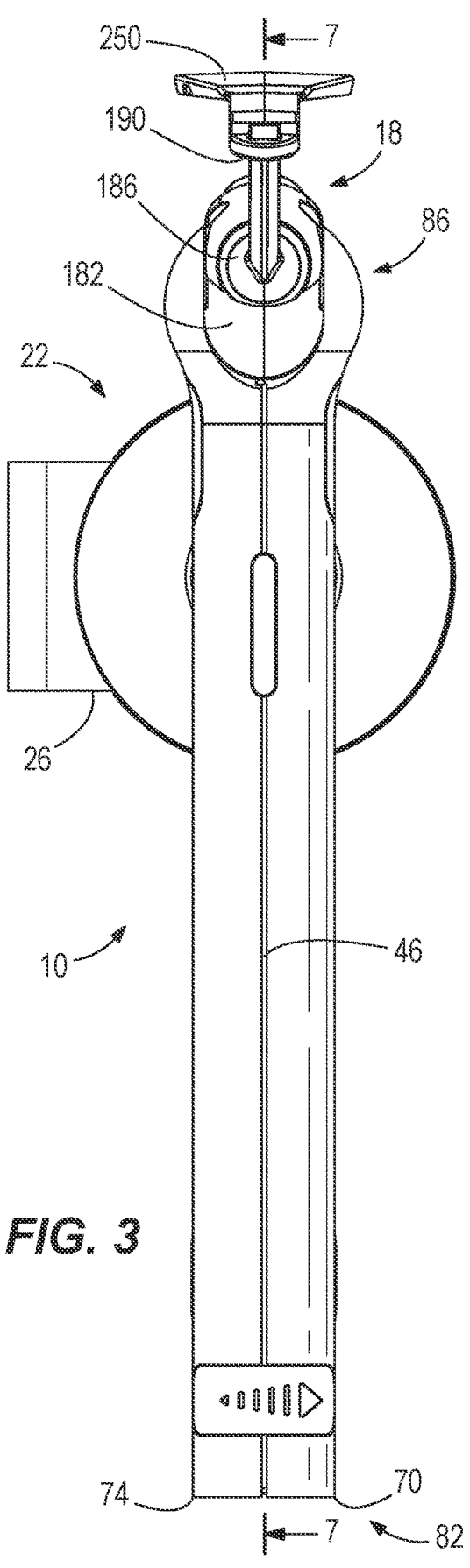
FIG. 3 is a top view of the support structure of FIG. 1.

With reference to FIGS. 1 and 3, the second arm 46 includes a first half 70 and a second half 74. The first half 70 and the second half 74 of the second arm 46 are coupled together to define a second arm cavity 78. In other words, the first half 70 of the second arm 46 defines a portion of the second arm cavity 78, and the second half 70 of the second arm 46 defines a portion of the second arm cavity 78. In the illustrated embodiment, the second arm 46 may be formed as two or more separate structures. In other embodiments, the second arm 46 may be formed monolithically as a single structure.

As shown in FIGS. 2 and 3, the second arm 46 includes a first end 82 and a second end 86 opposite the first end 82. A longitudinal axis L extends centrally through the second arm 46 between the first end 82 and the second end 86. In some embodiments, the second arm 46 may be a straight or elongated straight arm extending between the first end 82 and the second end 86. In some embodiments, the second arm 46 is coupled to the joint 50 by a joint pin 90. In other embodiments, the second arm 46 is coupled to the joint 50 by a fastener.

Figure 5:
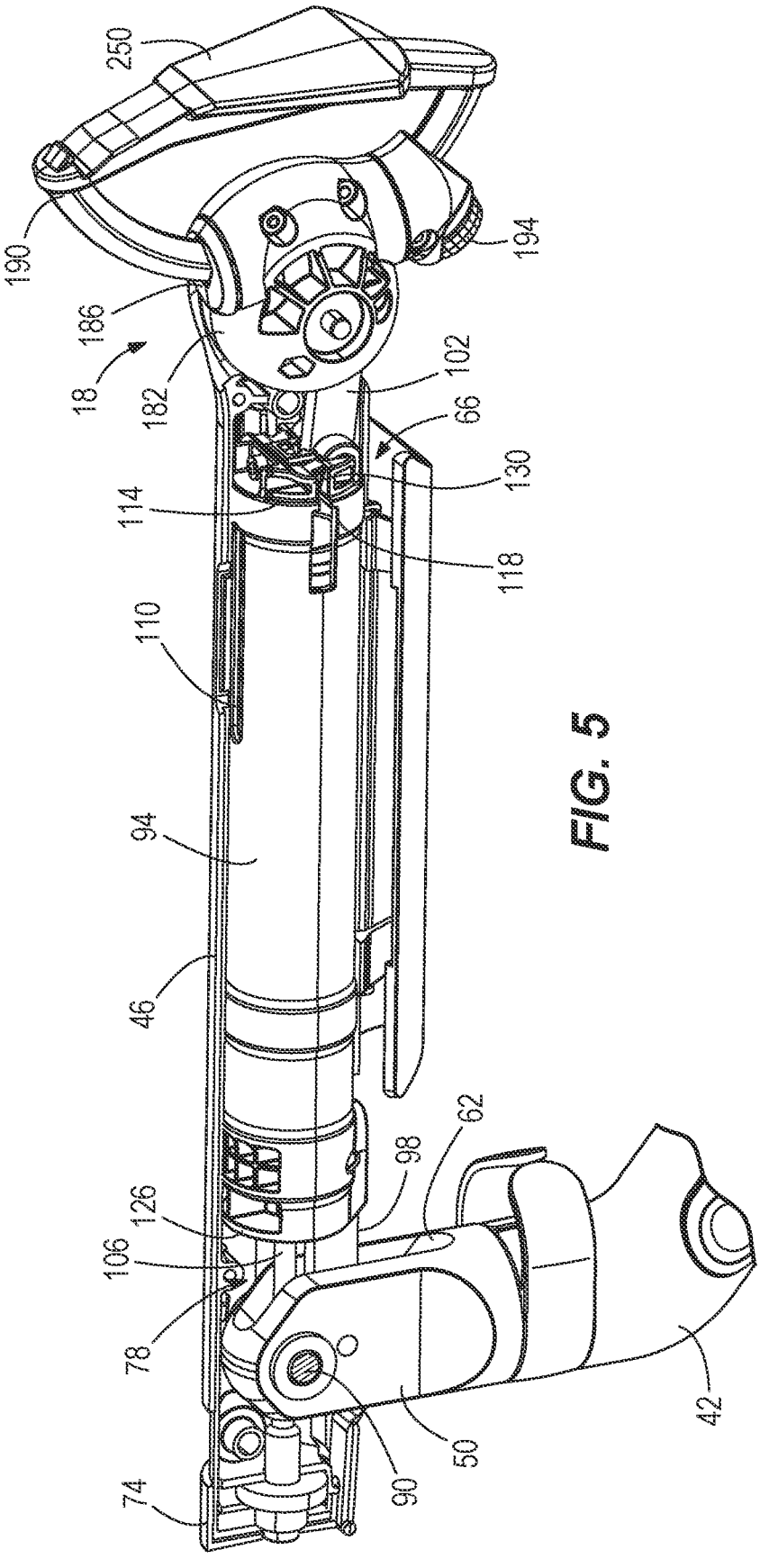
FIG. 5 is a side perspective view of the support structure of FIG. 1 with portions removed.
Figure 7:
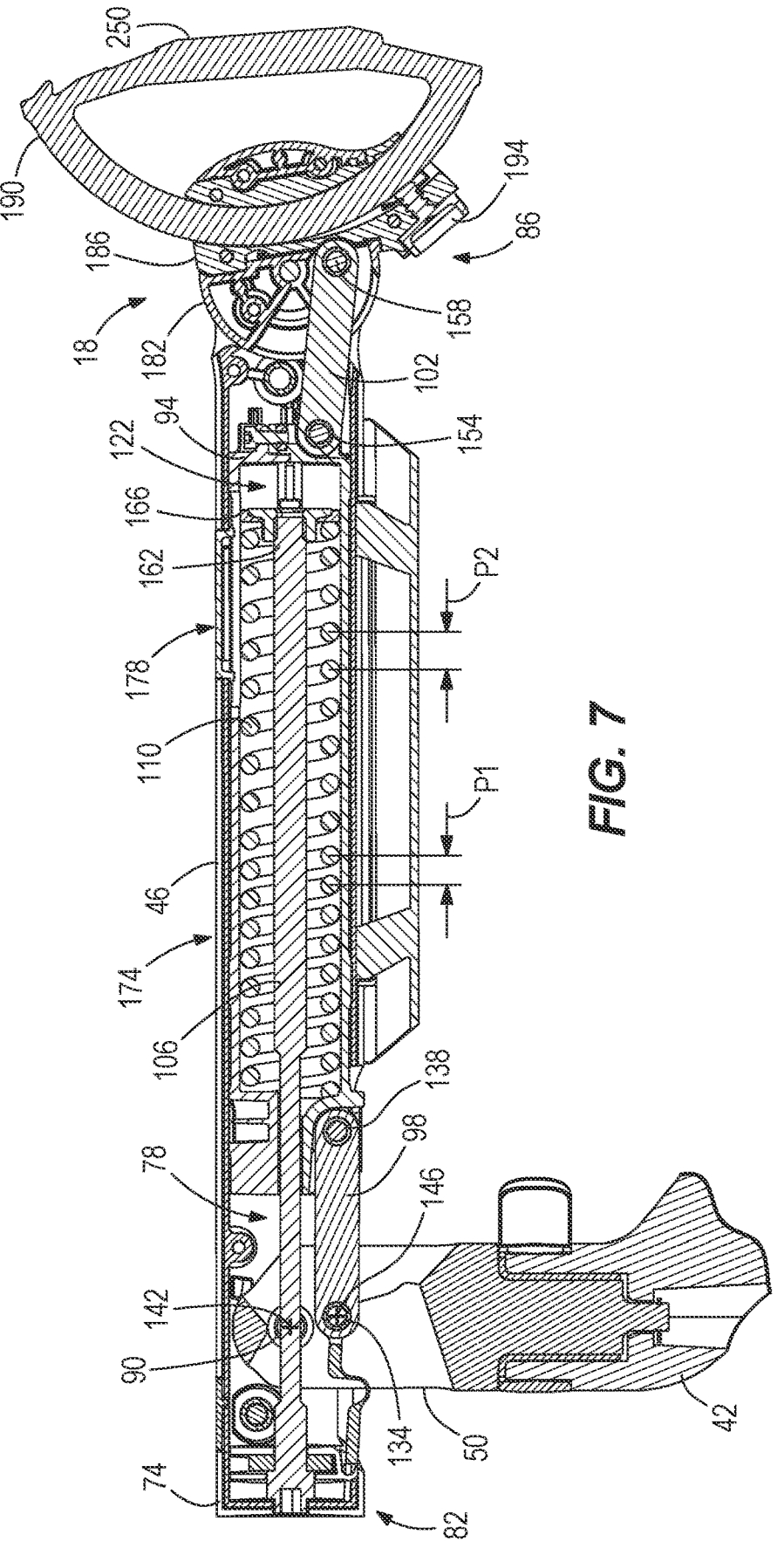
FIG. 7 is a cross sectional view of the support structure of FIG. 1 through line 7-7 of FIG. 3.
Figure 9:
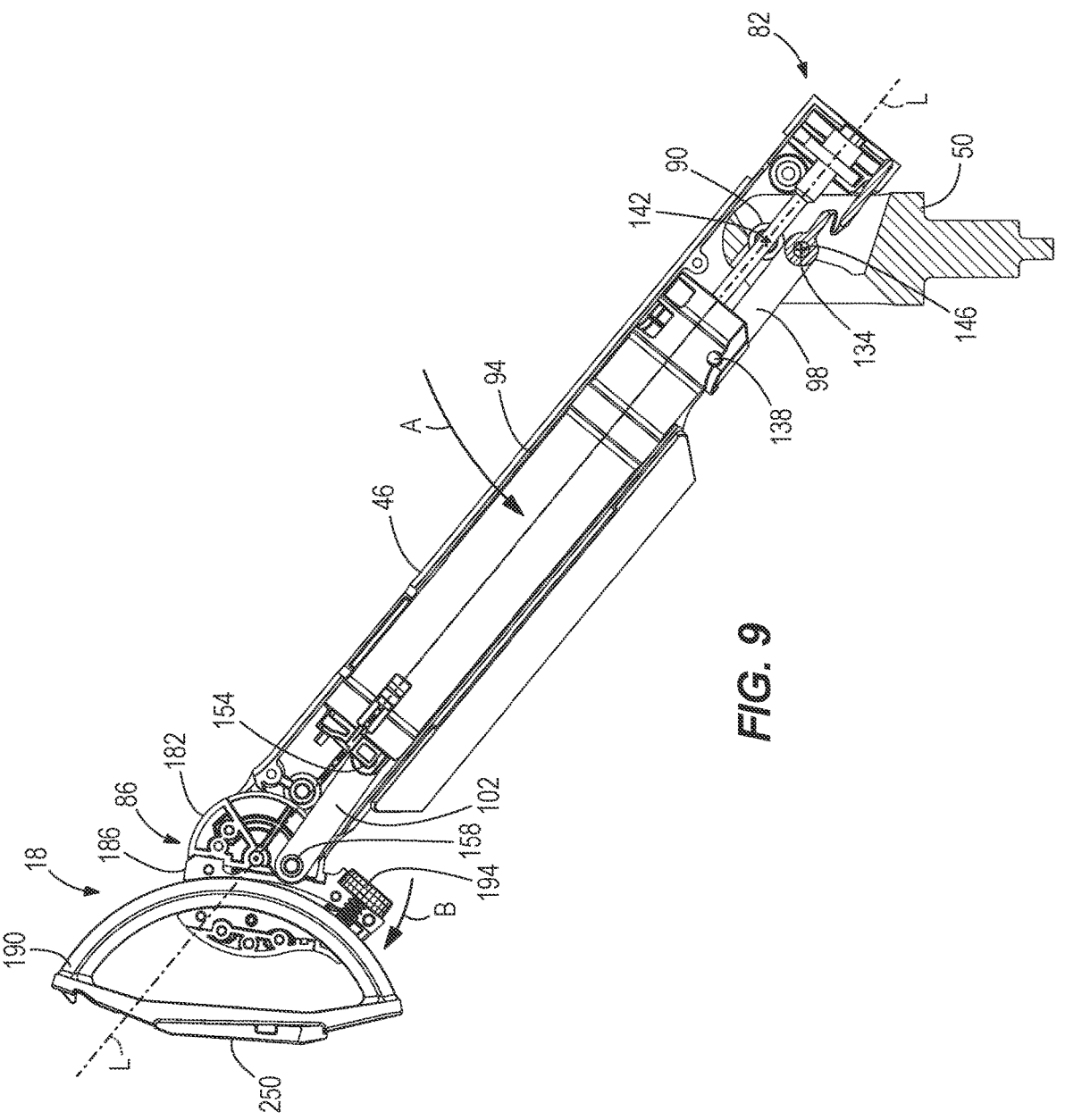
FIG. 9 is a cross sectional view of the support structure of FIG. 1 through line 7-7 of FIG. 3 in a first position.
Figure 10:
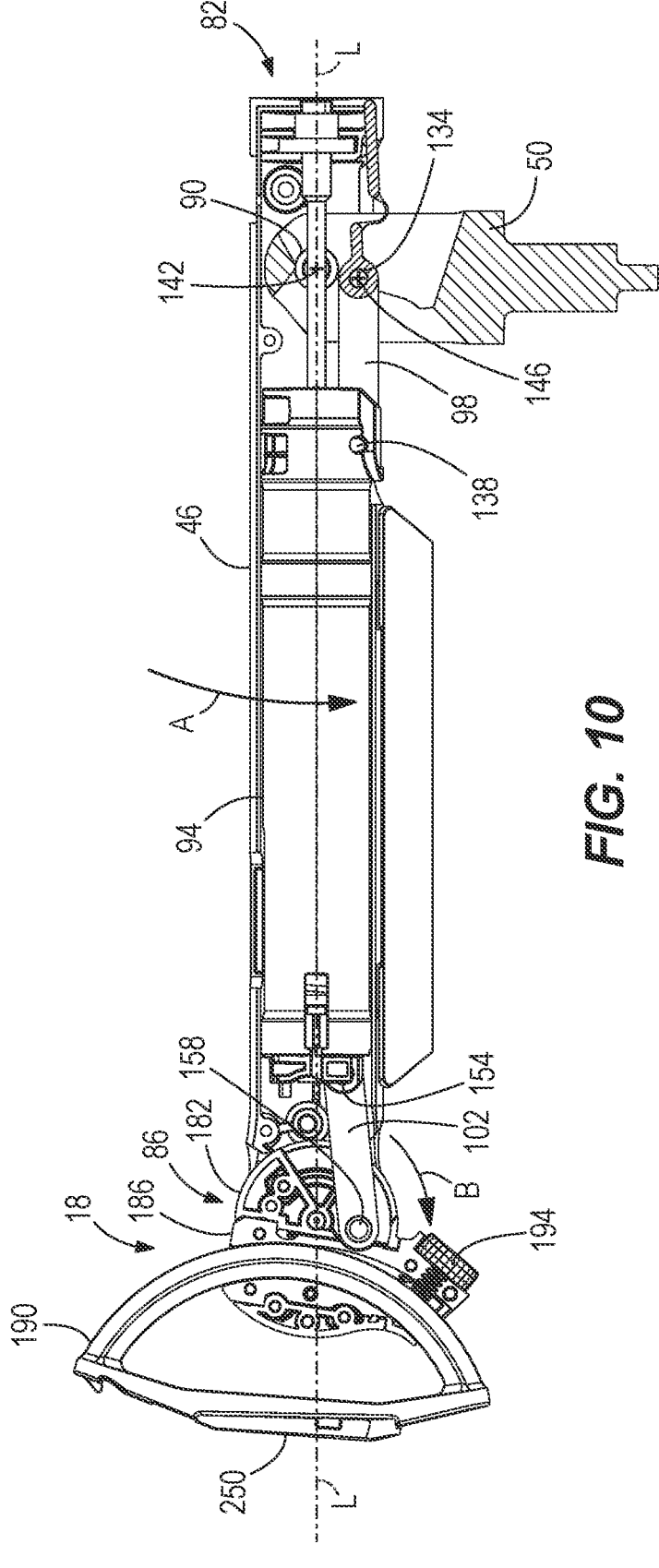
FIG. 10 is a cross sectional view of the support structure of FIG. 1 through line 7-7 of FIG. 3 in a second position.
Figure 11:
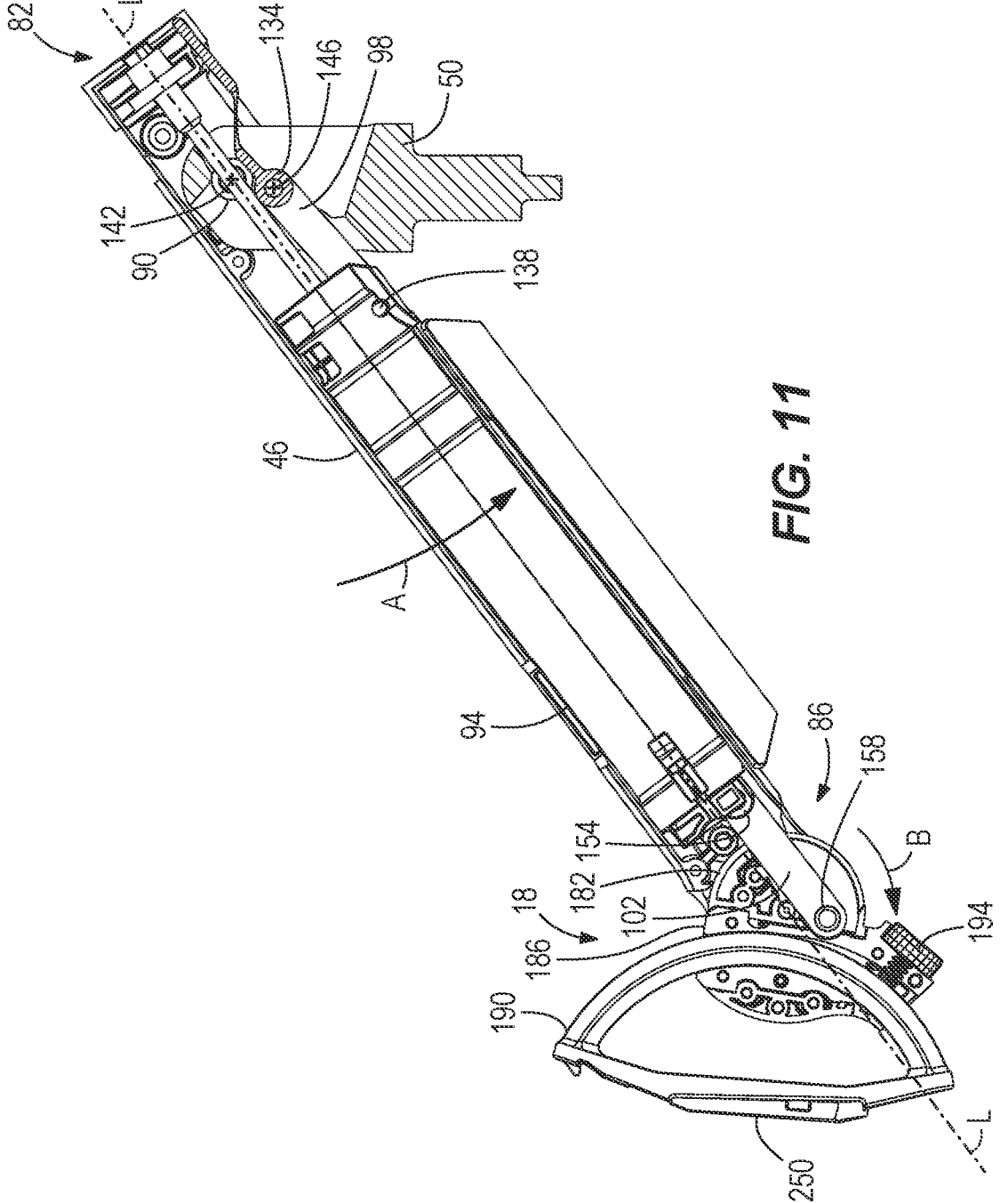
FIG. 11 is a cross sectional view of the support structure of FIG. 1 through line 7-7 of FIG. 3 in a third position.

FIGS. 5 and 7 illustrate the linkage assembly 66 according to an exemplary embodiment. The following description is exemplary, and certain aspects and features of the linkage assembly 66 may differ in other embodiments. For example, the size, shape, number of links, and coupling mechanisms of the linkage assembly 66 may differ in other embodiments. The linkage assembly 66 may be positioned in the second arm 46, and in particular, the second arm cavity 78. In other embodiments, the linkage assembly 66 may be coupled to the second arm 46 outside the second arm cavity 78. The linkage assembly 66 may be movable along the longitudinal axis L. The linkage assembly 66 may include a three-bar linkage assembly configured to ensure the head 18 (and thus, the display) remains "comparatively parallel" or "rotationally fixed" relative to a surface (e.g., desk or table) as the second arm 46 is rotated in a direction A (FIG. 9). More specifically, as the second arm 46 rotates relative to a stationary surface, such as a wall or a desk, the head 18 will rotate relative to the second arm 46 so that the head 18 maintains a generally constant rotational position relative to the stationary surface. In other words, despite movement of the second arm 46 relative to the stationary surface, the head 18 is rotationally fixed relative to the stationary surface so that the orientation of the display remains the same. As shown in FIGS. 9-11, the head assembly remains in the same rotational position regardless of the orientation of the second arm 46. It should be understood that the position of the head 18 relative to the stationary surface may not be perfect, and there may be a few degrees of freedom (i.e., a margin of error) in which the head 18 may have some rotational variation.

With continued reference to FIGS. 5 and 7, in the illustrated embodiment, the linkage assembly 66 includes a slider 94, a first link 98, and a second link 102. The slider 94, the first link 98, and the second link 102 form a three-bar linkage assembly, which is capable of maintaining the head 18 in a consistent orientation regardless of the angle of the second arm 46. The linkage assembly 66 may further include a spring 110, which helps to maintain the position of the linkage assembly 66, and thus the display, in a desired position. In some embodiments, the linkage assembly 66 may optionally include an adjustment screw 106 for adjusting the spring 110. However, there may be other ways to design the three-bar linkage assembly in other embodiments capable of maintaining a constant orientation of the head 18. As described in more detail below, the linkage assembly 66 is configured to generate a force that counteracts a weight of a display to maintain the display above a surface in a plurality of positions.

Figure 6:
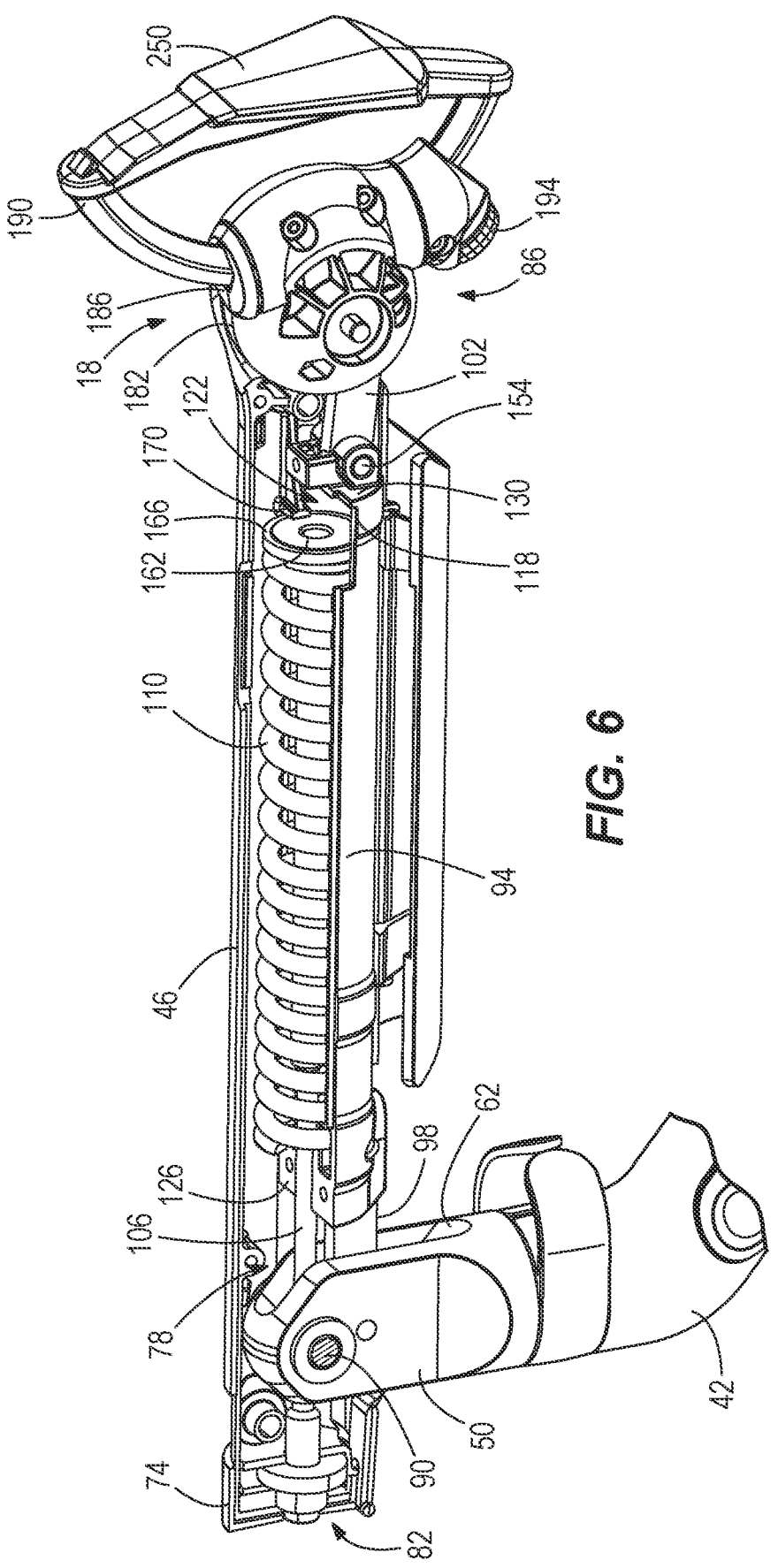
FIG. 6 is a side perspective view of the support structure of FIG. 1 with portions removed.

With reference to FIGS. 5 and 6, the slider 94 includes a first part 114 and a second part 118. The first part 114 and the second part 118 are coupled together to define a slider cavity 122. In other embodiments, the slider 94 may be formed monolithically as a single structure. The slider 94 includes a first end portion 126 and a second end portion 130 opposite the first end portion 126. The slider 94 is positioned in the second arm 46. More specifically, the slider 94 is positioned in the second arm cavity 78. The slider 94 may be movable along the longitudinal axis L. In other words, the slider 94 may be slidable along the longitudinal axis L within the second arm cavity 78.

As shown in FIG. 7, the first link 98 is arranged between the joint 50 and the slider 94. The first link 98 may also be referred to as a power link. More specifically, the first link 98 is connected to joint 50 by a first pin 134 and is connected to the slider 94 by a second pin 138. In other words, the first link 98 is connected to the first end portion 126 of the slider 94 by the second pin 138. In some embodiments, the first link 98 may be configured to transmit a force from the spring 110 to the joint 50.

Figure 8:
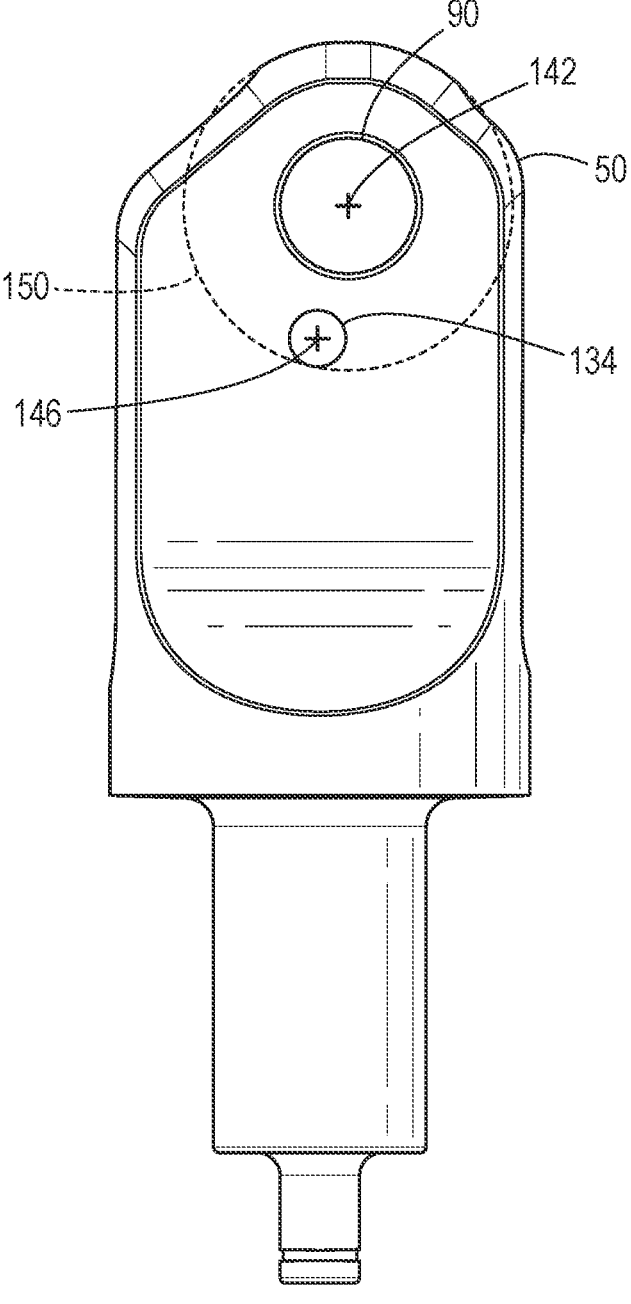
FIG. 8 is a side view of a joint of the support structure of FIG. 1.

With reference to FIGS. 7 and 8, the first pin 134 of the first link 98 is located in relation to the joint pin 90. A joint axis 142 extends through a longitudinal center of the joint pin 90. A pin axis 146 extends through a longitudinal center of the first pin 134. In some embodiments, the pin axis 146 is below and forward the joint axis 142 when viewing the support structure 10 in a cross-sectional view, as shown in FIG. 7. In other words, the pin axis 146 is closer to the second end 86 of the second arm 46 and the first arm 42 compared to the joint axis 142.

As shown in FIG. 8, the joint pin 90 defines a virtual circle 150 centered at the joint axis 142 when viewing the joint 50 from a side view or a cross sectional view of the support structure 10. The virtual circle 150 includes a radius measured from the joint axis 142 to a point away from the joint axis 142. In some embodiments, the radius of the virtual circle 150 may range from 8 mm to 16 mm. In other embodiments, the radius of the virtual circle 150 may range from 8 to 12 mm, 9 to 13 mm, 10 to 14 mm, 11 to 15 mm, or 12 to 16 mm. For example, the radius of virtual circle 150 may be 8, 9, 10, 11, 12, 13, 14, 15, or 16 mm.

As shown in FIG. 8, the pin axis 146 may be positioned in the virtual circle 150. In other words, the location of the pin axis 146 is within a boundary of the virtual circle 150. Still, in other words, the pin axis 146 may not be located outside the boundary of the virtual circle 150. The location of the first pin 134 (i.e., the pin axis 146) in relation to the joint pin 90 (i.e., the joint axis 142) ensures the first link 98 is approximately parallel with the slider 94 and the second link 102. In some embodiments, positioning the first link 98 approximately parallel with the slider 94 and the second link 102 ensures the linkage assembly 66 generates a suitable spring force to support the second arm 46 for a preferred range of display weights and range of positions in the direction A.

As shown in FIGS. 6 and 7, the second link 102 is arranged between the slider 94 and the head 18. More specifically, the second link 102 is connected to the slider 94 by a first pin 154, and is connected to the head 18 by a second pin 158. In particular, the second link 102 is connected to the second end portion 130 of the slider 94 by the first pin 154. In some embodiments, the second link 102 may be configured to convert the sliding or linear motion of the slider 94 to rotational motion of the head 18 in a direction B (FIG. 9).

With reference to FIGS. 6 and 7, the adjustment screw 106 is positioned in the second arm cavity 78. The adjustment screw 106 may be inserted at the first end 82 of the second arm 46. The adjustment screw 106 extends through the joint slot 62 and the slider 94 (FIG. 5). The adjustment screw 106 includes a distal end portion 162 and an end plate 166 coupled to the distal end portion 162. In some embodiments, the adjustment screw 106 is configured to adjust the position of the end plate 166 thereby increasing or decreasing a length of the spring 110. Adjusting the length of the spring 110 may increase or decrease the force the spring 110 applies against the slider 94 and to the first link 98 pivotally connected to the joint 50. In some embodiments, the force the spring 110 applies against the slider 94 counteracts a weight of a display to maintain the display at a desired position (e.g., height). In other words, when a user adjusts the support structure 10 to a desired display height, the spring 110 will help to automatically maintain the display at the desired height without a locking mechanism to hold the support structure 10 in place.

The force the spring 110 applies against the slider 94 may be adjusted to support a range of display weights. The linkage assembly 66 allows for a range of displays having different weights to be supported above a surface for a plurality of positions.

As shown in FIG. 6, the second arm 46 includes a ledge 170 extending from a sidewall of the second arm 46. The ledge 170 may extend from the sidewall of the second arm 46 into the second arm cavity 78. The end plate 166 may contact or abut the ledge 170. In some examples, the end plate 166 contacts the ledge 170 when the spring 110 is in a relaxed state, and the end plate 166 is separated from the ledge 170 when the spring 110 is in a compressed state.

FIGS. 6 and 7 illustrate the spring 110 positioned in the slider 94. In some embodiments, the spring 110 may be a compression spring. The spring 110 may include a plurality of spring constants. In one embodiment, the spring 110 may be a dual rate spring including two spring constants. In some embodiments, the spring 110 includes a first portion 174 having a first spring constant and a second portion 178 having a second spring constant. The first spring constant may be different than the second spring constant. In these embodiments, the first portion 174 of the spring 110 may include a first pitch and the second portion 178 of the spring 110 may include a second pitch. The first pitch may be different than the second pitch. In other embodiments, the spring 110 may include more than two spring constants such as three, four, or five.

In the illustrated embodiment, the first portion 174 of the spring 110 may be adjacent the first end portion 126 of the slider 94 and the second portion 178 of the spring 110 may be adjacent the second end portion 130. In other embodiments, the second portion 178 of the spring 110 may be adjacent the first end portion 126 of the slider 94 and the first portion 174 of the spring 110 may be adjacent the second end portion 130 of the slider 94. In the illustrated embodiment, the first portion 174 includes a first pitch and the second portion 178 includes a second pitch, where the first pitch is less than the second pitch. In the illustrated embodiment, the first portion 174 includes a first spring constant and the second portion 178 includes a spring second constant, where the first spring constant is less than the second spring constant. In some embodiments, the plurality of spring constants of the spring 110 may allow for precise or gradual application of force against the slider 94 to support a range of display weights compared to prior springs that utilize a single spring constant.

In operation, as shown in FIGS. 9-11, the arm assembly 14, and in particular, the second arm 46 may be rotated to a plurality of positions along a direction A (and reverse). Specifically, the second arm 46 may rotate about the joint axis 142. In some embodiments, the second arm 46 may be movable to a top position (FIG. 9), a middle position (FIG.

10), and a bottom position (FIG. 11), or a plurality of other intermediate positions. The linkage assembly 66 is configured to ensure the head 18, in which a display is connected to, remains rotationally fixed relative to a surface (e.g., desk) so that the position of the display remains consistent in all positions of the second arm 46. More specifically, the three-bar linkage assembly, which may include the slider 94, the first link 98, and the second link 102, converts linear motion along the longitudinal axis L into rotational motion of the head 18 in a direction B (FIG. 9). The adjustment screw 106 may adjust a position of the end plate 166 within the slider 94 thereby adjusting the compression of the spring 110 to accommodate a range of display weights, and including curve displays, which shift the center of gravity more forwardly than a flat display. The linkage assembly 66 ensures the arm assembly 14 generates enough power to maintain the display above a surface in all positions along the direction A. For example, the linkage assembly 66 ensures the arm assembly 14 does not spring up (i.e., large amount of power) when the display is in the bottom position (FIG. 11), and the arm assembly 14 does not droop down (i.e., not enough power) when the display is in the top position (FIG. 9).

Figure 12:
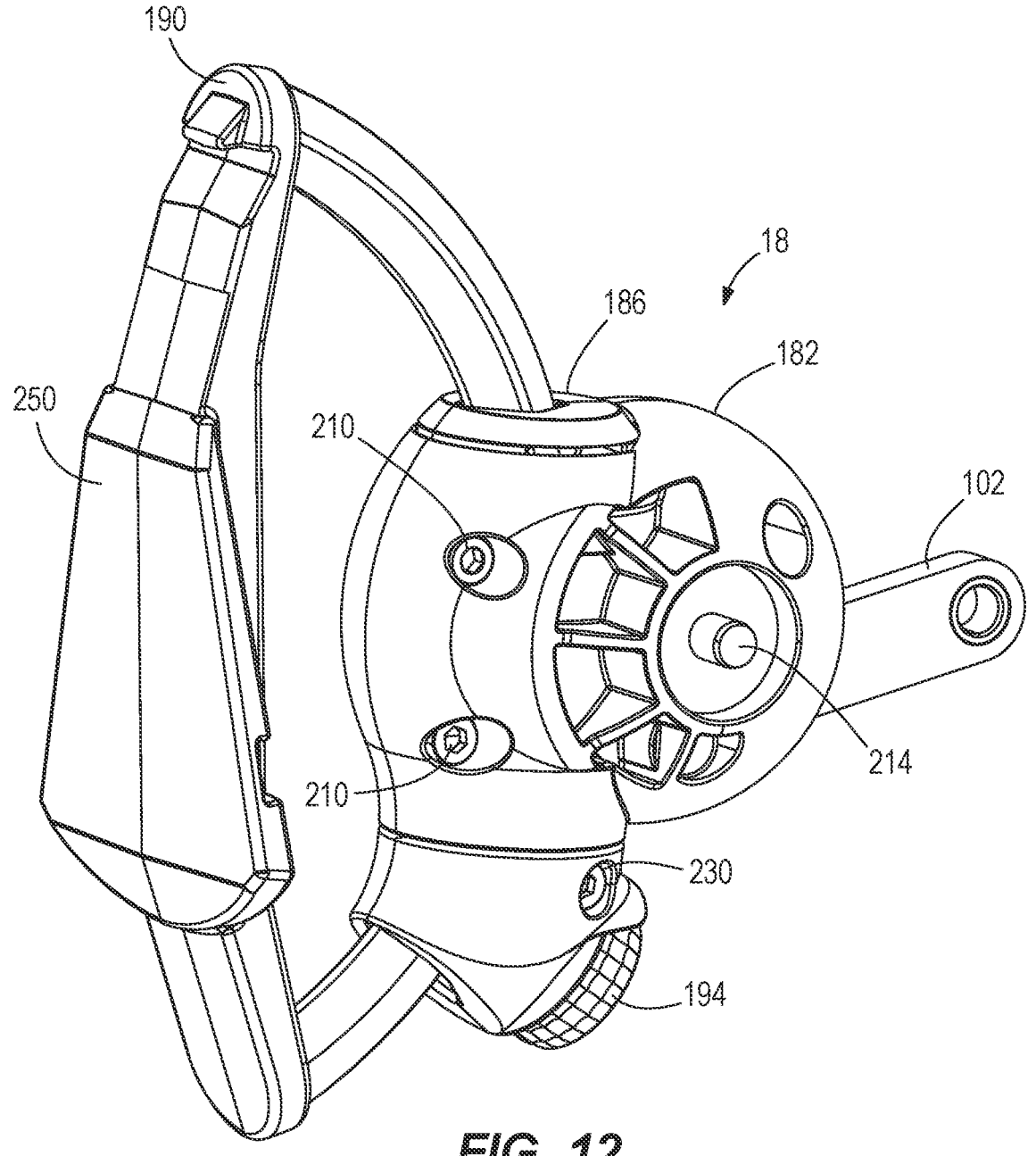
FIG. 12 is a perspective view of a head of the support structure of FIG. 1.
Figure 14:
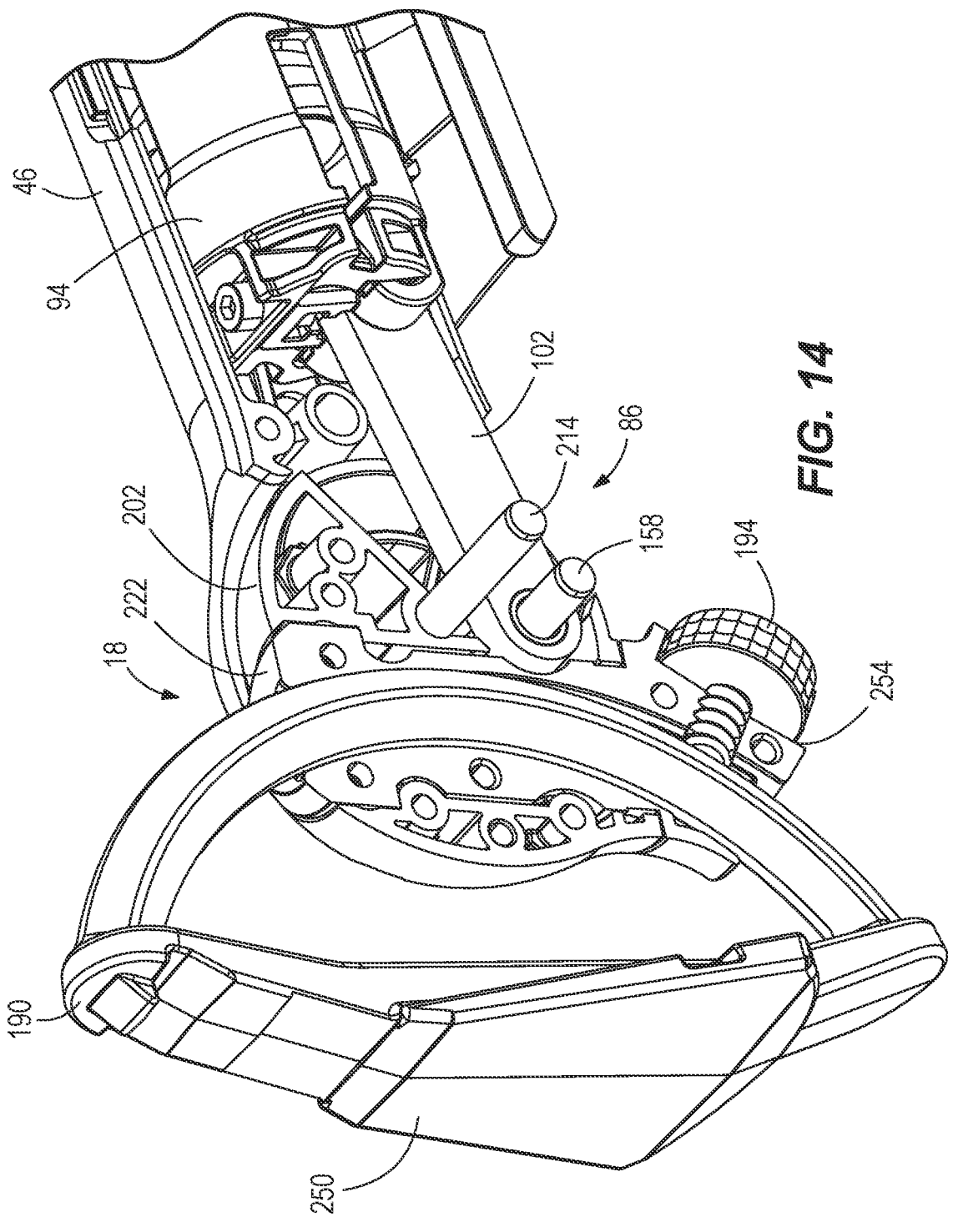
FIG. 14 is a perspective view of the head of FIG. 12 with portions removed.

FIGS. 12 and 14 illustrate an exemplary head 18 for movably supporting a display on the support structure 10. In particular, the head 18 is configured to movably support the display on the arm assembly 14. The head 18 is pivotally connected to a distal portion of the second arm 46. The head 18 may also be referred to as a mounting head or tilt head. The head 18 includes a joint body 182, a pan head 186, a ring 190, and a tilt adjustment screw 194. As described in more detail below, the head 18 is configured to adjust a tilt of a display to a plurality of tilt angles, and is configured to adjust a pan of the display to a plurality of pan angles relative to a surface.

Figure 13:
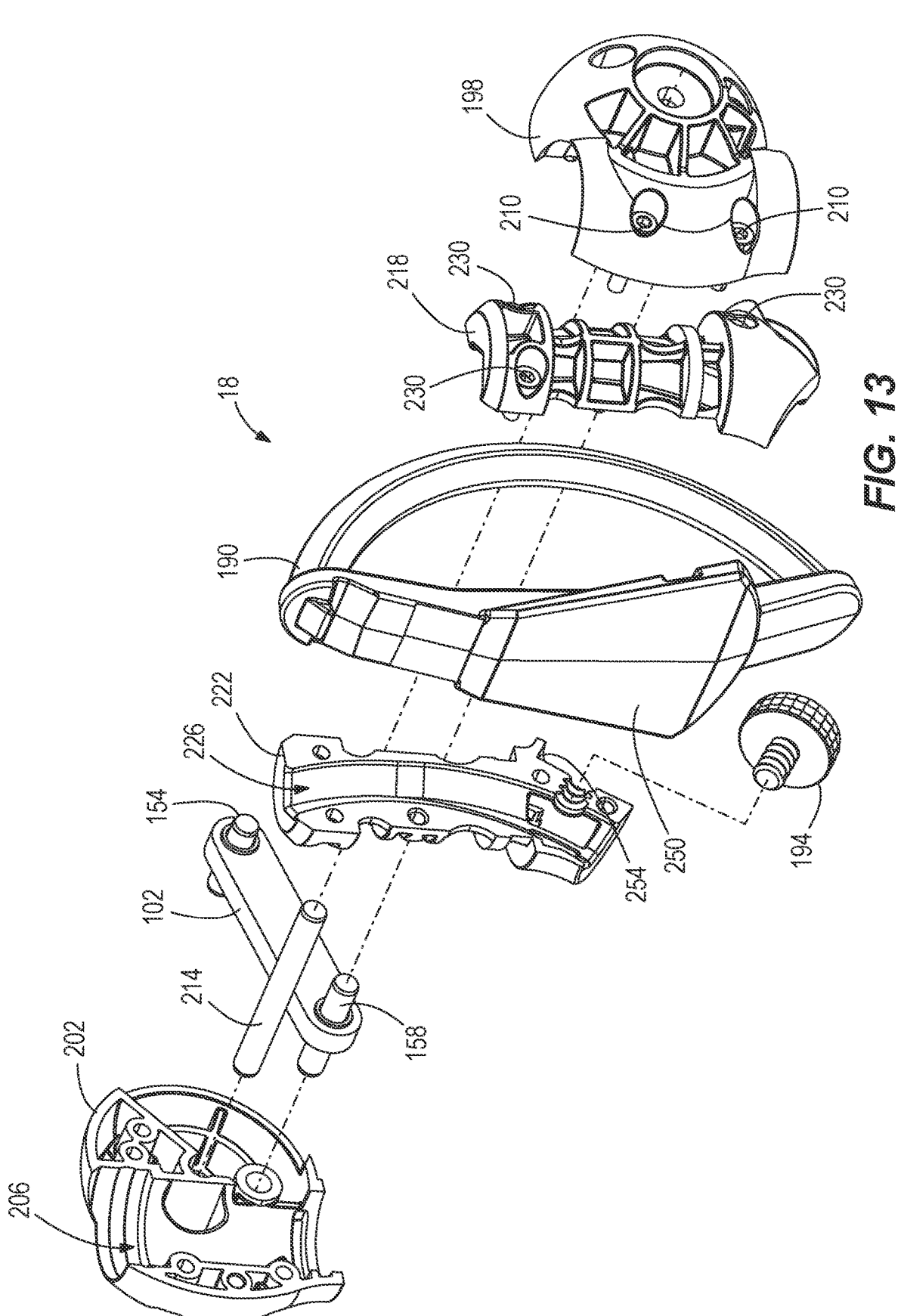
FIG. 13 is an exploded view of the head of FIG. 12.

With reference to FIGS. 13 and 14, the joint body 182 includes a first part 198 and a second part 202. The first part 198 and the second part 202 are coupled together to define a joint body cavity 206. In the illustrated embodiment, the first part 198 and the second part 202 may be coupled together by fasteners 210. In the illustrated embodiments, the joint body 182 may be formed as two or more separate structures. In other embodiments, the joint body 182 may be formed monolithically as a single structure. The joint body 182 is coupled to the arm assembly 14, and in particular, the second arm 46 by a joint body pin 214.

With continued reference to FIGS. 12 and 14, the joint body 182 is connected to the second link 102. More specifically, the second pin 158 of the second link 102 pivotally connects the joint body 182 to the linkage assembly 66. The joint body 182 is configured to rotate in the direction B as the slider 94 slides or moves along the longitudinal axis L when the second arm 46 is adjusted to a plurality of positions along the direction A (FIG. 9). Together, the body joint 182 and the linkage assembly 66 may convert linear motion linear motion of the linkage assembly 66 into rotational movement of the head 182. This may be done automatically with movement of the second arm 64 without further intervention of an operator to adjust the head 18. This may be possible by using a 4-bar linkage assembly or 3-bar linkage assembly to help automatically impart rotational movement of the head 18, which counteracts the rotational movement of the second arm 64. For example, in some embodiments, the joint body 182 and at least a portion of the linkage assembly 66 may be a scotch yoke mechanism or reverse scotch yoke mechanism such that the linear movement of the linkage assembly 66 converts to rotational movement of the joint body 182. Similarly, the joint body 182 and the linkage assembly 66 may be sliding crank linkage capable of converting the linear movement of the linkage assembly 66 into rotational movement of the head 18. Although there may be other types of mechanisms capable of automatically rotating the head 18 to maintain a consistent orientation relative to a stationary surface, such as a wall or a desk.

With reference to FIGS. 13 and 14, the pan head 186 includes a first portion 218 and a second portion 222. The first portion 218 and the second portion 222 of the pan head 186 are coupled together to define a pan head channel 226. The first portion 218 and the second portion 222 of the pan head 186 are coupled together by fasteners 230. In the illustrated embodiment, the pan head 186 may be formed as two or more separate structures. In other embodiments, the pan head 186 may be formed monolithically as a single structure.

Figures 15, 16:
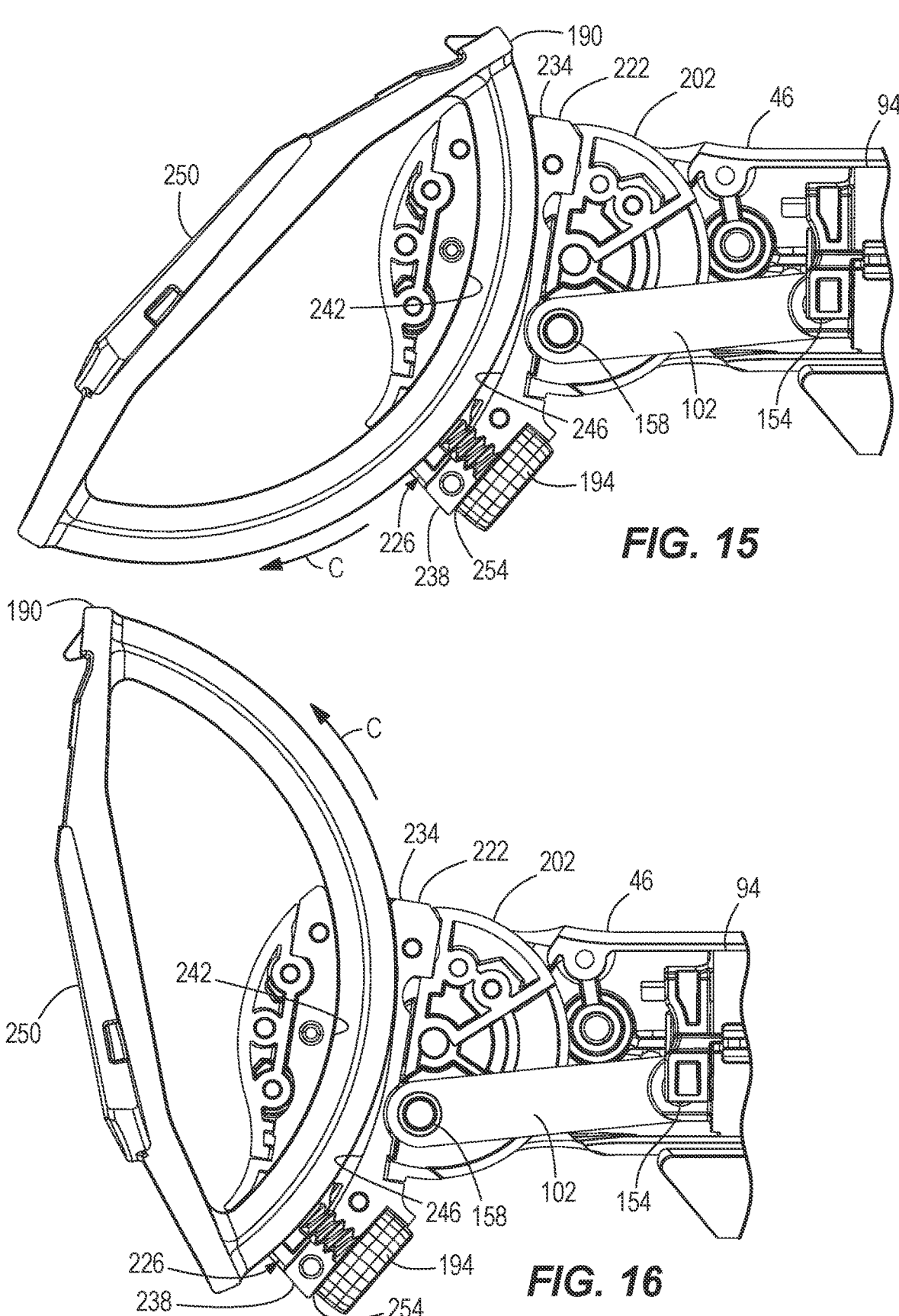
FIG. 15 is a side view of the head of FIG. 12 with portions removed.
FIG. 16 is a side view of the head of FIG. 12 with portions removed.

With continued reference to FIGS. 15 and 16, the pan head 186 includes a first or top end 234, a second or bottom end 238, a first surface 242, and a second surface 246. The first portion 218 and the second portion 222 of the pan head 186 each form a portion of the top end 234, the bottom end 238, the first surface 242, and the second surface 246. The pan head channel 226 extends between the top end 234 and the bottom end 238, and extends between the first surface 242 and the second surface 246. A width may be measured between the first surface 242 and the second surface 246 (i.e., a transverse width measured across the pan head channel 226 between the first surface 242 and the second surface 246). In some embodiments, the pan head channel 226 includes a variable width between the top end 234 and the bottom end 238. In some embodiments, the pan head channel 226 includes a first width adjacent the top end 234 and a second width adjacent the bottom end 238. The second width of the pan head channel 226 is greater than the first width of the pan head channel 226. In operation, the pan head 186 is movably received in the joint body 182. The pan head 186 rotates relative to the joint body. The pan head 186 is rotatable within the joint body 182 to a plurality of rotational positions.

Figure 17:
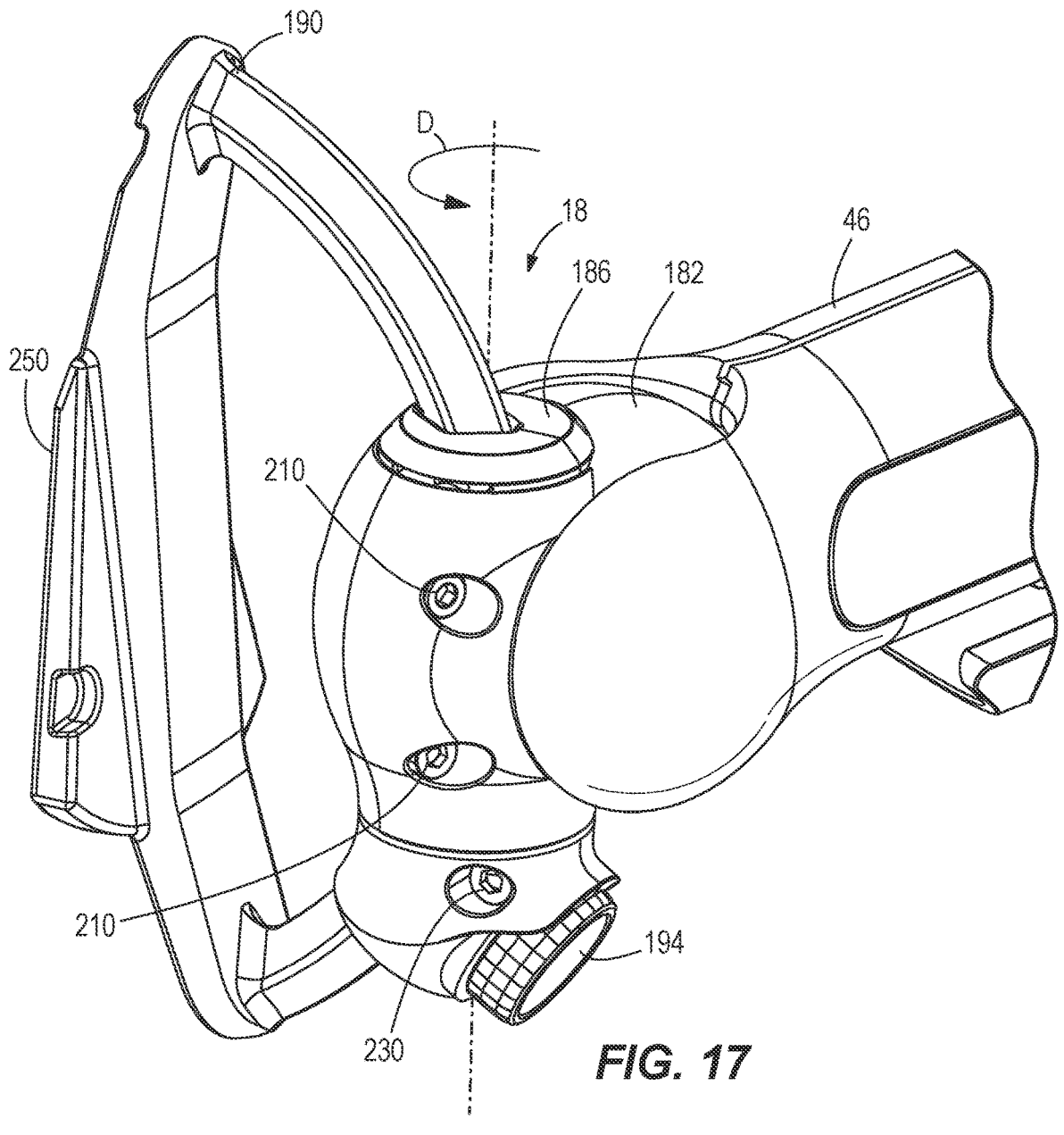
FIG. 17 is a perspective view of an end of the support structure of FIG. 1.

With reference to FIGS. 13 and 14, the ring 190 may be a D-ring. The ring 190 may be other shapes in other embodiments. The ring 190 includes a mounting surface 250 configured to support a display. In the illustrated embodiment, the mounting surface 250 includes a diamond shape. In other embodiments, the mounting surface 250 may include other shapes suitable to support a display. The ring 190 is movably received in the pan head channel 226 to adjust a tilt of a display to a plurality of tilt angles. The ring 190 is movable to the plurality of tilt angles in a direction C (FIGS. 15 and 16). Further, the ring 190 is rotatable with the pan head 186 to a plurality of rotational positions relative to the joint body 182 in a direction D (FIG. 17). In the illustrated embodiment, the ring 190 is formed monolithically as a single structure. In other embodiments, the ring 190 may be formed as two or more separate structures.

Figures 18, 19:
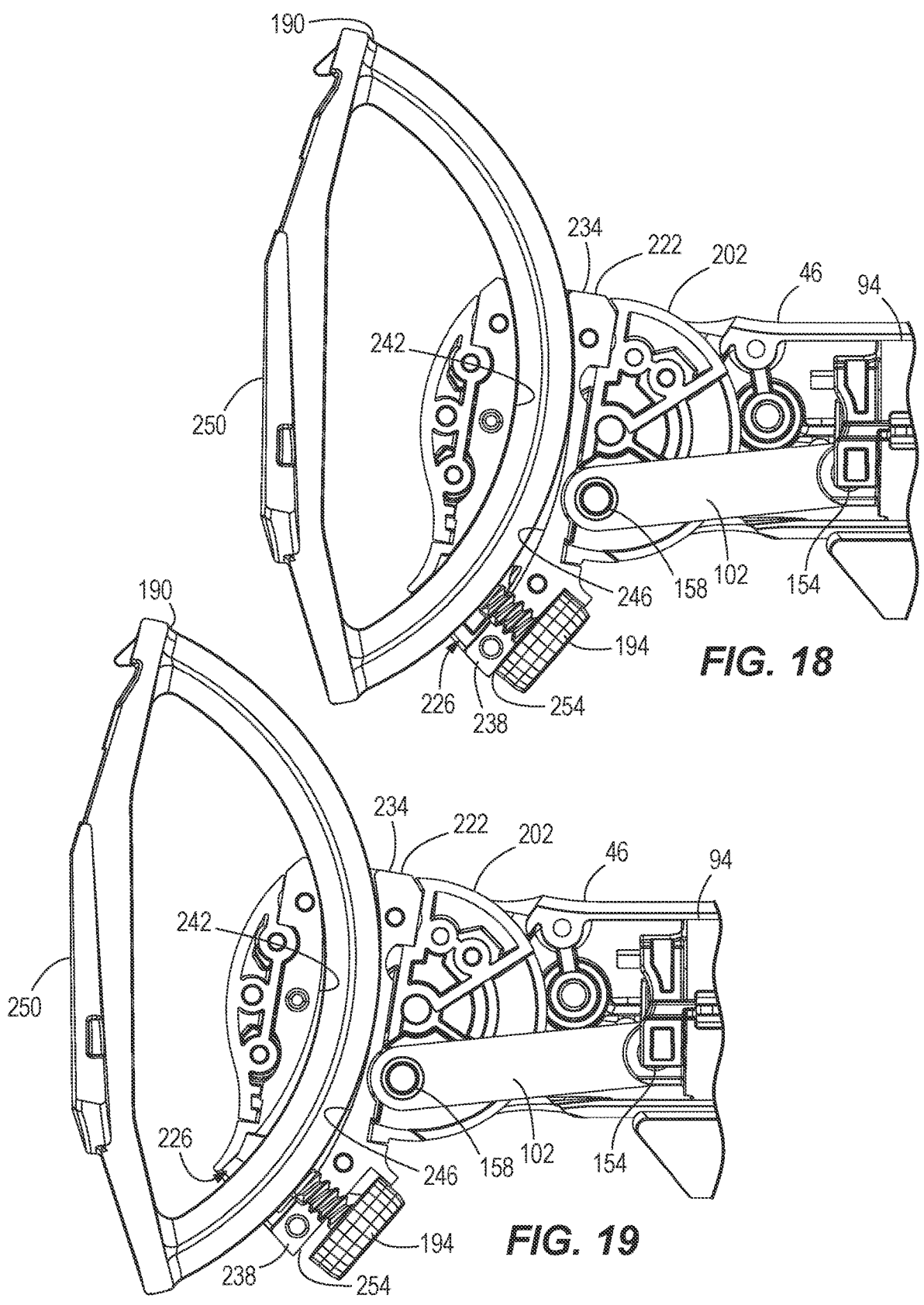
FIG. 18 is a side view of the head of FIG. 12 with portions removed.
FIG. 19 is a side view of the head of FIG. 12 with portions removed.

As shown in FIGS. 18 and 19, the pan head 186 defines a recess 254 for receiving the tilt adjustment screw 194. The tilt adjustment screw 194 may also be referred to as a tilt adjustment fastener. The tilt adjustment screw 194 is threadably coupled to the pan head 186. The tilt adjustment screw 194 is in contact with the ring 190. In operation, when the tilt adjustment screw 194 is in a first position, the tilt adjustment screw 194 positions the ring 190 closer to the first surface 242 to increase the contact between the ring 190 and the first surface 242 of the pan head 186. In some embodiments, the tilt adjustment screw 194 is fully received in recess 254 in the first position. In other words, the ring 190 is positioned in the pan head channel 226 in a first configuration when the tilt adjustment screw 194 is in the first position. The ring 190 is movable relative to the pan head 186 and the joint body 182 to a plurality of tilt angles. The ring 190 moves relative to the pan head 186 under a first frictional force when the tilt adjustment screw 194 is in the first position.

With continued reference to FIGS. 18 and 19, when the tilt adjustment screw 194 is in a second position, the tilt adjustment screw 194 positions the ring 190 closer to the second surface 246 to increase the contact between the ring 190 and the second surface 246 of the pan head 186. In some embodiments, the tilt adjustment screw 194 is in a retracted position relative to the pan head 186 while still being coupled to the pan head 186 in the second position. In other words, the ring 190 is positioned in the pan head channel 226 in a second configuration when the tilt adjustment screw 194 is in the second position. The ring 190 is movable relative to the pan head 186 and the joint body 182 to a plurality of tilt angles. The ring 190 moves relative to the pan head 186 under a second frictional force when the tilt adjustment screw 194 is in the second position. The second frictional force is greater than the first frictional force.

Representative Features

Representative features are set out in the following clauses, which stand alone or may be combined, in any combination, with one or more features disclosed in the text and/or drawings of the specification.

(1) A support structure for supporting a display, the support structure comprising a base element, an arm rotatably coupled to the base element, the arm defining a longitudinal axis extending between a first end of the arm and a second end of the arm, a head for movably supporting the display on the arm, and a linkage assembly movable along the longitudinal axis, the linkage assembly including a spring having a plurality of spring constants configured to generate a force that counteracts a weight of the display to maintain the display in a plurality of positions relative to a surface.

(2) The support structure according to (1), wherein the linkage assembly is configured to maintain a consistent orientation of the head relative to the surface when the arm is adjusted to the plurality of positions.

(3) The support structure according to (1), wherein the linkage assembly includes a slider, a first link pivotally connected to the base element and the slider, and a second link pivotally connected to the slider and the head.

(4) The support structure according to any one of (1) to (3), wherein the spring is positioned in the slider.

(5) The support structure according to any one of (1) to (4), wherein the spring is configured to apply a force against the slider to counteract the weight of the display to automatically maintain the display above the surface.

(6) The support structure according to (1), wherein the spring includes a first portion having a first spring constant and a second portion having a second spring constant that is greater than the first spring constant, and wherein the second spring constant is positioned closer to the head than the first spring constant.

(7) The support structure according to (1), wherein the head includes a joint body movably connected to the arm, the joint body pivotally connected to the linkage assembly.

(8) The support structure according to any one of (1) to (7), wherein the joint body and the linkage assembly are configured to convert the linear movement of the linkage assembly to rotational movement of the joint body.

(9) The support structure according to any one of (1) to (8), wherein the head further includes a pan head movably received in the joint body and a ring movably supporting the display on the arm.

(10) The support structure according to any one of (1) to (9), wherein the ring is slidable within the pan head to adjust a tilt of the display, and wherein the pan head is rotatable relative to the joint body to adjust a pan angle of the display.

(11) A support structure for supporting a display, the support structure comprising a base element, an arm coupled to the base element, the arm extending along a longitudinal axis between a first end and a second end, a head for movably supporting the display on the arm, and a linkage assembly including a slider movable along the longitudinal axis, a first link pivotally connected to the base element and the slider, a second link pivotally connected to the slider and the head, and a spring positioned in the slider.

(12) The support structure according to (11), wherein the linkage assembly is configured to automatically maintain a consistent orientation of the head relative to the surface when the arm is adjusted to the plurality of positions.

(13) The support structure according to any one of (11) to (12), wherein the spring applies a force against the slider to counteract the weight of the display to automatically maintain the display above the surface.

(14) The support structure according to (11), wherein the head includes a joint body pivotally coupled to the second link, and wherein the joint body and the linkage assembly are configured to convert the linear movement of the linkage assembly to rotational movement of the joint body.

(15) The support structure according to (11), wherein the spring includes a first portion having a first spring constant and a second portion having a second spring constant that is greater than the first spring constant, and wherein the second spring constant is positioned closer to the head than the first spring constant.

(16) A support structure for supporting a display, the support structure comprising an arm extending along a longitudinal axis between a first end and a second end, a tilt head rotatably coupled to a first end of the arm, the tilt head including a joint body movably connected to the support structure, a pan head received in the joint body and movable relative to the joint body, and a ring received in the pan head, the ring movable with the pan head to adjust the display to a plurality of different tilt angles, the ring rotatable relative to the pan head to adjust the display to a plurality of different rotational angles relative to a surface; and a linkage assembly positioned in the arm and coupled to the tilt head, the linkage assembly configured to rotate the tilt head when the arm rotates to counteract the rotation of the arm and maintain a consistent orientation of the tilt head.

(17) The support structure according to (16), wherein the linkage assembly includes a spring having a plurality of spring constants configured to generate a force that counteracts a weight of the display to maintain the display in a plurality of positions relative to a surface.

(18) The support structure according to (16), wherein the pan head includes a first portion and a second portion coupled to first portion, wherein the first portion and the second portion together define a channel for receiving the ring.

(19) The support structure according to any one of (16) to (18), further comprising a screw threadably coupled to the pan head, wherein the screw is configured to adjust the ring between a first configuration and a second configuration.

(20) The support structure according to any one of (16) to (19), wherein the ring is movable in the channel under a first frictional force in the first configuration, and wherein the ring is movable in the channel under a second frictional force greater than the first frictional force.

Although the invention has been described in detail with reference to certain preferred embodiments, variations and modifications exist within the scope and spirit of one or more independent aspects of the invention as described.

Various features of the invention are set forth in the following claims.

What is claimed is:

1. A support structure for supporting a display, the support structure comprising:
   a base element;
   an arm rotatably coupled to the base element, the arm defining a longitudinal axis extending between a first end of the arm and a second end of the arm;
   a head for movably supporting the display on the arm; and
   a linkage assembly movable along the longitudinal axis, the linkage assembly including a spring having a plurality of spring constants configured to generate a force that counteracts a weight of the display to maintain the display in a plurality of positions relative to a surface.

2. The support structure of claim 1, wherein the linkage assembly is configured to maintain a consistent orientation of the head relative to the surface when the arm is adjusted to the plurality of positions.

3. The support structure of claim 1, wherein the linkage assembly includes a slider, a first link pivotally connected to the base element and the slider, and a second link pivotally connected to the slider and the head.

4. The support structure of claim 3, wherein the spring is positioned in the slider.

5. The support structure of claim 4, wherein the spring is configured to apply a force against the slider to counteract the weight of the display to automatically maintain the display above the surface.

6. The support structure of claim 3, wherein the slider, first link, and second link form a three-bar linkage configured to maintain a consistent orientation of the head relative to the surface when the arm is adjusted to the plurality of positions.

7. The support structure of claim 1, wherein the spring includes a first portion having a first spring constant and a second portion having a second spring constant that is greater than the first spring constant, and wherein the second spring constant is positioned closer to the head than the first spring constant.

8. The support structure of claim 1, wherein the head includes a joint body movably connected to the arm, the joint body pivotally connected to the linkage assembly.

9. The support structure of claim 8, wherein the joint body and the linkage assembly are configured to convert the linear movement of the linkage assembly to rotational movement of the joint body.

10. The support structure of claim 8, wherein the head further includes a pan head movably received in the joint body and a ring movably supporting the display on the arm.

11. The support structure of claim 10, wherein the ring is slidable within the pan head to adjust a tilt of the display, and wherein the pan head is rotatable relative to the joint body to adjust a pan angle of the display.

12. The support structure of claim 1, wherein the spring includes a first portion having coils of a first pitch to provide a first spring constant and a second portion having coils of a second pitch different from the first pitch to provide a second spring constant different from the first spring constant.

13. The support structure of claim 1, wherein the spring includes a first portion having a first spring constant and a second portion having a second spring constant that is greater than the first spring constant, and wherein the first portion is positioned closer to the head than the second portion.

14. The support structure of claim 1, further comprising an adjustment screw for adjusting the force generated by the spring.

15. A support structure for supporting a display, the support structure comprising:
   a base element;
   an arm coupled to the base element, the arm extending along a longitudinal axis between a first end and a second end;
   a head for movably supporting the display on the arm; and
   a linkage assembly including
      a slider movable along the longitudinal axis,
      a first link pivotally connected to the base element and the slider,
      a second link pivotally connected to the slider and the head, and
      a spring positioned in the slider,
   wherein the spring includes a first portion having a first spring constant and a second portion having a second spring constant that is greater than the first spring constant, and
   wherein the second spring constant is positioned closer to the head than the first spring constant.

16. The support structure of claim 15, wherein the linkage assembly is configured to automatically maintain a consistent orientation of the head relative to a surface when the arm is adjusted to a plurality of positions.

17. The support structure of claim 16, wherein the spring applies a force against the slider to counteract the weight of the display to automatically maintain the display above the surface.

18. The support structure of claim 17, further comprising an adjustment screw for adjusting the force of the spring against the slider.

19. The support structure of claim 15, wherein the head includes a joint body pivotally coupled to the second link, and wherein the joint body and the linkage assembly are configured to convert the linear movement of the linkage assembly to rotational movement of the joint body.

20. The support structure of claim 15, wherein the first portion has coils of a first pitch to provide the first spring constant and the second portion has coils of a second pitch different from the first pitch to provide the second spring constant.

21. The support structure of claim 15, wherein the slider, first link, and second link form a three-bar linkage configured to maintain a consistent orientation of the head relative to a surface when the arm is adjusted to a plurality of positions.

22. A support structure for supporting a display, the support structure comprising:

an arm extending along a longitudinal axis between a first end and a second end;

a tilt head rotatably coupled to a first end of the arm, the tilt head including a joint body movably connected to the support structure, a pan head received in the joint body and movable relative to the joint body, and a ring received in the pan head, the ring movable with the pan head to adjust the display to a plurality of different tilt angles, the ring rotatable relative to the pan head to adjust the display to a plurality of different rotational angles relative to a surface; and a linkage assembly positioned in the arm and coupled to the tilt head, the linkage assembly configured to rotate the tilt head when the arm rotates to counteract the rotation of the arm and maintain a consistent orientation of the tilt head.

23. The support structure of claim 22, wherein the linkage assembly includes a spring having a plurality of spring constants configured to generate a force that counteracts a weight of the display to maintain the display in a plurality of positions relative to a surface.

24. The support structure of claim 23, wherein the spring includes a first portion having coils of a first pitch to provide a first spring constant and a second portion having coils of a second pitch different from the first pitch to provide a second spring constant different from the first spring constant.

25. The support structure of claim 23, further comprising an adjustment screw for adjusting the force generated by the spring.

26. The support structure of claim 22, wherein the pan head includes a first portion and a second portion coupled to first portion, wherein the first portion and the second portion together define a channel for receiving the ring.

27. The support structure of claim 26, further comprising a screw threadably coupled to the pan head, wherein the screw is configured to adjust the ring between a first configuration and a second configuration.

28. The support structure of claim 27, wherein the ring is movable in the channel under a first frictional force in the first configuration, and wherein the ring is movable in the channel under a second frictional force greater than the first frictional force.

29. The support structure of claim 22, wherein the linkage assembly includes a three- bar linkage.

* * * * *